Oct. 15, 1957 D. B. ARDERN 2,809,871
LIFT DISENGAGER
Filed June 12, 1951 2 Sheets-Sheet 1
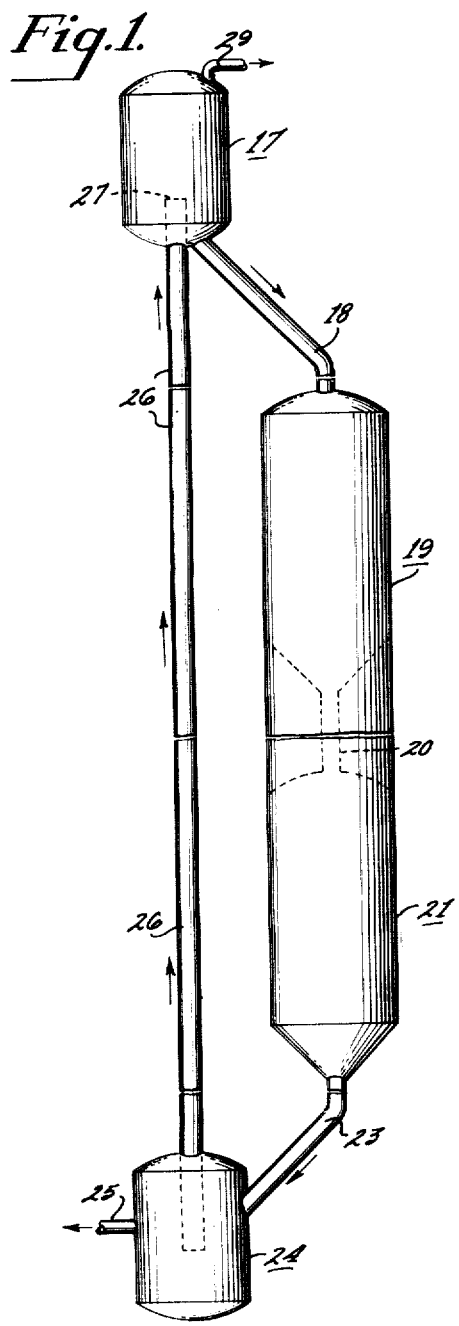
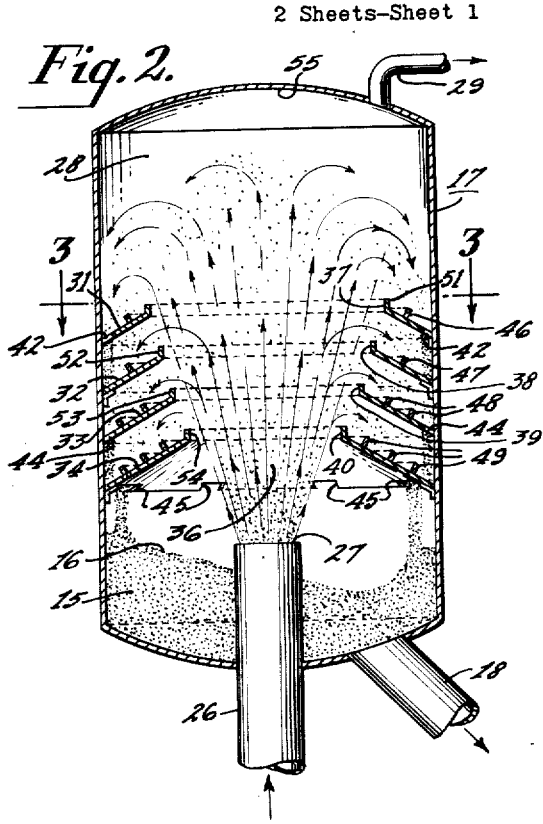
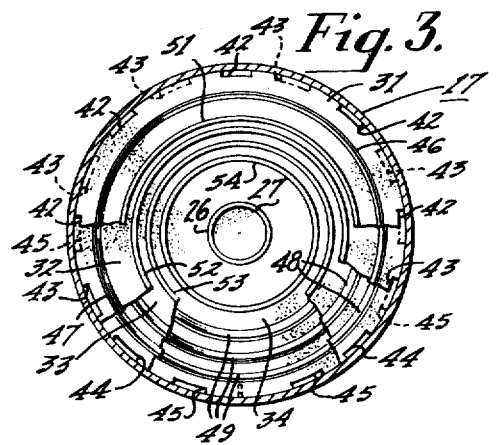
INVENTOR
David B. Ardern
BY
ATTORNEY

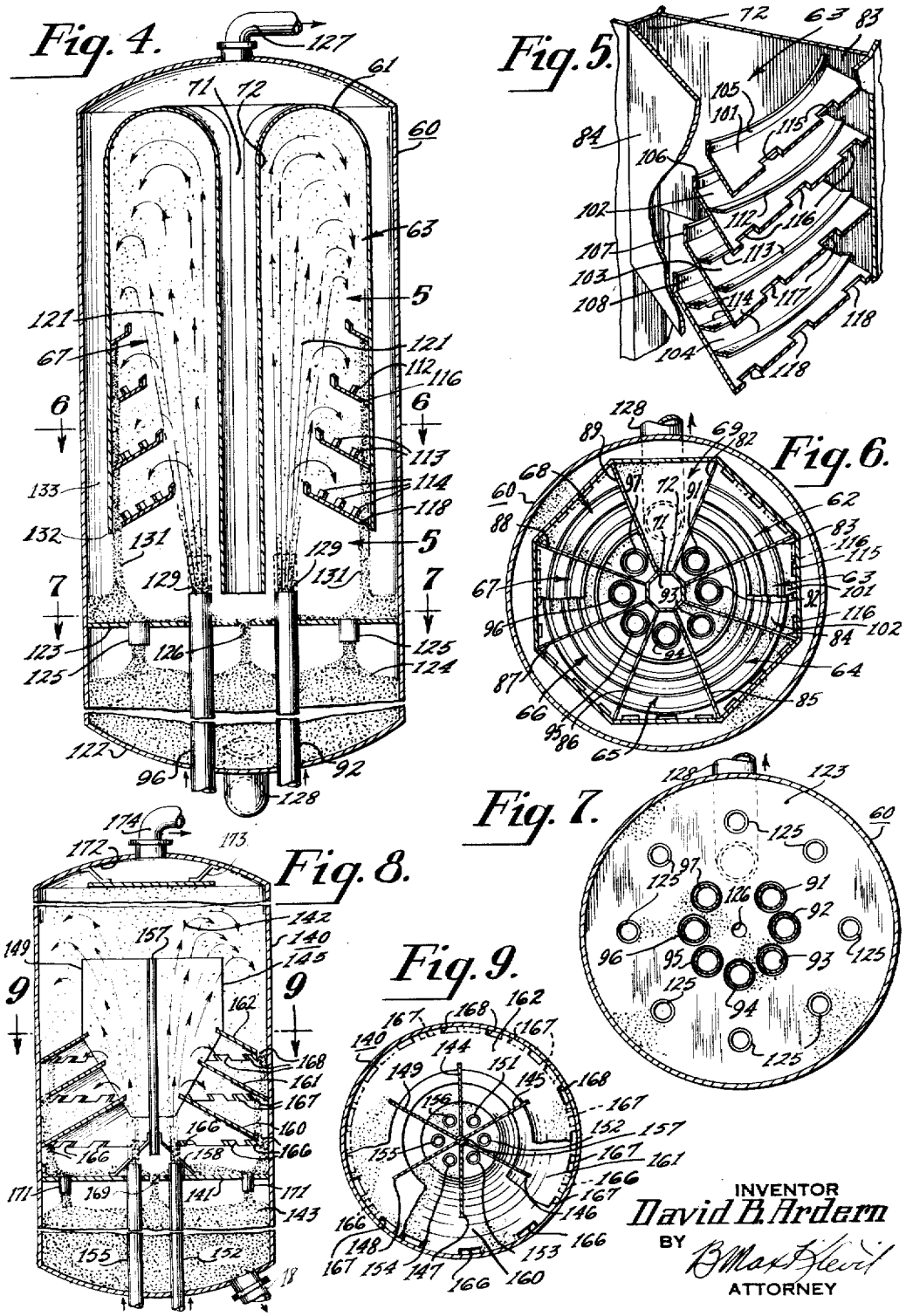

United States Patent Office 2,809,871
Patented Oct. 15, 1957

2,809,871

LIFT DISENGAGER

David B. Ardern, Moylan, Pa., assignor to Houdry Process Corporation, Wilmington, Del., a corporation of Delaware Application June 12, 1951, Serial No. 231,241

15 Claims. (Cl. 302—59)

This invention relates to a processing system wherein free-flowing particles, especially granules or pellets of relatively frangible, solid material such as contact materials used, for instance, in chemical treating operations are at least for the most part continuously moved through one or more substantially closed circuits, each of which includes (a) a downflow pass, wherein the granular solids travel through at least one processing zone in which it participates in a processing step, and (b) also an upflow pass, which receives the free-flowing solids from the downflow pass and wherein they are elevated at least usually by a pneumatic lift, and (c) a separating or disengaging zone above the upflow pass and into which the solids-fluid mixture emerging from the lift discharges for the solids to be separated from the lifting fluid to return to the downflow pass, and wherein the separated solids, after having been raised an appreciable height until the momentum imparted to them by the lifting fluid is overcome by the pull of gravity, then fall usually a still greater distance on their return to the downflow pass and are thereby exposed to the possibility of undesirable amount of attrition upon falling against the disengager bottom or previously fallen solids temporarily at rest, or relatively so, on it.

The invention involves a modification of the operation of such processing systems and of the method of handling such solids particularly in the separating or disengaging zone, whereby the falling granular solids are restrained against developing high enough velocity to result in disadvantageously high impact when the solids meet those which had fallen before them or the disengager bottom. Also included is the applicable improved apparatus.

The systems embracing the method and apparatus of the invention are more usually applicable in such chemical procedures where, for example, granular solids or pellets are used either as an inert agent in an operation, as for heat exchange, to furnish or remove heat from a fluid, gaseous (whether single gas or mixture, a vapor, or gas-vapor mixture) or liquid, as heat for distillations or fractionation or cooling for condensations, or to supply heat to the fluid to cause chemical reaction, for example, in thermal cracking of petroleum or its fractions, or to participate in some other manner such as to act as contact catalyst in various types of chemical reactions including cracking processes, or both to heat and act as a catalyst as in combined thermal and catalytic cracking, or otherwise. The method and apparatus of the invention are especially advantageously effective in those systems, in the downpass of which the granular solids travel as a downwardly moving, non-turbulent and relatively compact bed through the reactor zone, and then continue on in the circulation.

While not necessarily restricted to any specific chemical treating operation, the invention conveniently can be described in relation to its inclusion in a system wherein such granular catalytic solids are re-circulated through a substantially closed cycle, passing downwardly as such non-turbulent, relatively compact bed through a reaction zone and to and through a regeneration zone and from it to a pneumatic lift discharging into a disengager wherein the pull of gravity finally overcomes the momentum imparted to the solids as they emerge from the exit end of the lift, and they then fall to the bottom of the disengager or the disengaging zone to return to the downpass to re-track the circuit just completed. Such a re-circulation system occurs in various installations of a petroleum cracking process currently operating in this country.

Figures 1 and 2 in "New Houdriflow Installations Employ Modified Design," pages 170-175 of the September 1950 issue (volume 29, No. 9) of "Petroleum Refiner" show such a closed reactor above a regenerator from which the regenerated catalyst passes to a lower lift hopper and by a pneumatic (gas) lift is raised to the disengager (upper lift hopper), to be fed again on its downpass to the reactor, and so on again through the cycle. Highly desirable economies are obtained by the available advantage of gravity flow by locating the reactor over the regenerator, and the upper lift hopper over the reactor. The resulting greatly increased heights of such installations necessitate raising the catalyst pellets or beads much greater distances than required by other and earlier installations. Pneumatic lifts have been found more efficient and economical in power requirements and because of lower maintenance expense than bucket elevators, for such heights. It is not unusual for the granular catalyst to be raised in the range of about two hundred feet by the gas lift from the lower hopper to the upper hopper (or disengager), and commonly a distance of at least one hundred and fifty feet, and quite generally higher.

In present commercial practice the quantity of catalyst circulated ordinarily is not under about one hundred tons per hour and it is not unusual for catalyst circulation load to run as high as two hundred and fifty or three hundred tons per hour, and sometimes higher, as noted from the "Petroleum Refiner" article. In elevating such quantities of catalyst in concentrations of from about one to two pounds, and at times more, per cubic foot in lift pipes or practical diameter, the catalyst may reach an average velocity of at least thirty and usually about forty feet per second or higher, unless appropriate means are utilized to effect deceleration. The catalyst pellets emerging from the exit end of the lift at such velocities are propelled usually over twenty, and often as much as or more than thirty, feet above the top of the lift before they begin to drop in free fall through the empty disengager. An empty or hollow disengaging zone or disengager is one in whose disengaging zone there are no significant structures between the ceiling of the disengager and the top surface of the catalyst, or other solid material, surge bed, other than the extension of the lift pipe into the disengager. In other words, in such a disengaging zone after the granular solids discharged from the lift have risen as far as they can until their momentum is overcome by the pull of gravity, they drop in free fall, entirely uninterrupted, until they reach the bottom of the disengaging zone. The bottom of the disengaging zone is considered the bottom of the disengager when no solids have accumulated on it or the top surface of the surge bed of solids accumulated on its bottom.

To have the catalyst travel in its downpass through the reactor in a sufficiently compact mass, it is desirable to maintain on the bottom of the disengager (the upper lift hopper) an adequate depth of catalyst accumulation commonly called the surge bed. Since there will be some natural variation in the level of the surface of the catalyst surge bed at the bottom of the disengager hopper, the discharge end of the lift may extend at times a couple of feet above the top of the surge bed. Accordingly, the disengaged catalyst granules all too often drop about thirty feet and more by the end of their fall on landing on the top of the surge bed. Obviously, the impact on the individual pellets can be considerable after such a fall, which presents a real concern over the problem of the possible extent of attrition of the catalyst or other pellets or granules, especially where it is essential to maintain particular size ranges.

These and other problems encountered in disengaging or separating such granular solids from the solids-gas mixture stream discharging from a pneumatic lift into an empty disengaging zone are strikingly overcome by the method and applicable apparatus of the invention. Speaking broadly, the invention as to process involves the method of effectively reducing the maximum free fall velocity attainable by the descending granular solids by the end of their drop after disengagement from the lift fluid and thereby significantly reducing the force of their impact against the bottom of the disengaging zone, and likewise markedly lowering the possibility of attrition damage, which method comprises interrupting or breaking the already initiated fall of the disengaged granular solids by temporarily stopping or detaining them on at least one detaining surface out of the path of, and inclined downwardly in a direction away from, the ascending discharged granules, but in the path of the falling disengaged solids, and situated at least at an elevation between the exit end of the pneumatic lift and significantly below the highest point reached by the ascending granules, and compelling such temporarily detained solids to move down the detaining surface, or a layer of the solids resting on it, away from the ascending stream, and to leave the detaining surface through at least one overflow port, and preferably a plurality of them, at about the junction of the inclined surface and the wall enclosing the detaining surface, and to drop to any detaining surface below it, and with similarly handled solids from it to any detaining surface below it, and finally to the bottom of the disengaging zone. In a particularly effective form of the invention the falling solids are thus interrupted on a plurality of such inclined surfaces in sequence each at a lower level than the preceding one, within the stated range of elevation, and with its respectively similar overflow port or set of them, located at the junction of the inclined surfaces with the wall enclosing them, and finally drop down to the bottom of the disengaging zone. Any such surface at which the disengaged solids are temporarily detained or stopped, is at times called a falling-solids-stopping or detaining surface.

The various features and advantages of the method of the invention and of the practice of it as well as of the nature and operation of the apparatus of the invention can be more readily recognized and understood when described in relation to the accompanying drawings wherein: Figure 1 is a generalized representation in foreshortened elevation, of a catalytic hydrocarbon conversion (e. g. catalytic cracking) system, including a pneumatic lift feeding into a disengager internally equipped, according to the apparatus of the invention and to enable the operation of the method of the invention, as part of a continuous cycle involving circulation of catalyst granules or pellets; Figure 2 is a vertical section through the middle of the disengager of Figure 1; Figure 3 is a horizontally transverse section along the line 3—3 of Figure 2 and looking in the direction of the arrows; Figure 4 is a foreshortened vertical section through the middle of a modification of the disengager to serve a plurality of pneumatic lifts; Figure 5 is a partial and broken isometric view, namely, of the detaining tray carrying portion, between the levels of the lines 5 and 5 of Figure 4, and looking in the direction of the arrows, of one of the single lift disengaging sectors; Figures 6 and 7 are separate horizontally transverse sections along the lines 6—6 and 7—7 respectively of Figure 4 and looking in the direction of the arrows; Figure 8 is a foreshortened vertical section through the middle of a disengager serving six pneumatic lifts; and Figure 9 is a horizontally transverse section along the line 9—9 of Figure 8 and looking in the direction of the arrows.

In the system as represented in Figure 1, pelleted or drop molded (e. g. spherical) bead catalyst 15 (see Figure 2) flows downwardly from the catalyst surge bed 16 at the bottom of the lift disengaging hopper (or disengaging chamber, or merely disengager) 17 by gravity through the reactor seal leg 18 into the reactor 19 and through it as a downwardly moving, compact, non-turbulent bed through the reactor-and-kiln-connecting seal leg 20 into the regenerator kiln 21 and subsequently through the kiln outlet seal leg 23 into the lift engaging hopper 24. Lift gas entering the hopper 24 through the lift gas feed line 25 impels the catalyst from the bed of it in the hopper 24 into the lift pipe 26 through which the catalyst is elevated as a mixture of solid pellets in lift gas (or solids-fluid, or solids-gas, mixture) to the discharge or exit end 27 of the lift pipe 26 into the disengaging zone 28 of the disengager 17, for the solid catalyst 15 to be disengaged or separated from the lift gas to descend in stages, step by step, ultimately to join accumulated earlier separated catalyst in the catalyst surge bed 16 in the lowermost portion of the disengaging hopper 17. Except for the changes in construction introduced in the disengaging hopper 17, for the incorporation of features essential to the new apparatus, and the carrying out of the method, of the invention, the return of the disengaged catalyst to the catalyst surge bed 16 in the bottom of the hopper 17 completes one cycle in the continuous circulation in the catalytic hydrocarbon conversion system.

Additional details of such a cycle in such a conversion system can be developed from the article referred to above in "Petroleum Refiner" and in an article entitled "Houdriflow: New design in catalytic cracking" in the January 13, 1949, "Oil and Gas Journal" at page 78, and in part also in "The 'T. C. C.' catalytic cracking process for motor gasoline production," by R. H. Newton, G. S. Dunham and T. P. Simpson, in "Transactions of the American Institute of Chemical Engineers," volume 41, page 215, April 25, 1945, and in articles cited in it.

Now, referring back to the drawings, Figure 2 shows a disengager 17 of a construction embraced by the invention, enveloping its disengaging zone 28, with the lift pipe 26 entering centrally through the bottom and extending with its discharge or exit end 27 at a level above the top surface of the surge bed 16 (of catalyst to be maintained in it), the disengaged catalyst withdrawal line as part of the reactor seal leg 18 feeding downwardly outwardly from one side of the bottom, and the gas exit outlet 29 by which the lifting gas freed of catalyst granules leaves, suitably located at the top of the disengager.

Intermediate the exit end 27 of the lift 26 and the elevation in the disengaging zone to which the highest discharged portion of the solids emerging from the lift is carried, and suitably supported from the enveloping wall of the disengager, is a plurality or set or series of falling-solids, fall-breaking surfaces or trays 31, 32, 33, and 34 inclined radially inwardly upwardly toward the inverted frusto-conical course covered by the ascending peripherally flared out, solids-lifting gas stream 36 emerging from the exit end 27 of the lift. Each of the trays 31 through 34 does not extend inwardly upwardly so far that its inner edge lies in the path of the ascending solids-gas stream but far enough to be in the path of the falling disengaged solids (under the operating conditions planned for the installation). Therefore, each of these trays is provided with a central aperture 37, 38, 39, and 40 respectively, concentric with that of each of the other trays and larger than the one in any tray below it, and through which the solids discharged from the lift ascend, in sequence.

Along the outer boundary of each tray 31 through 34, at its junction with the enveloping wall of the disengager is a series of spaced apart, detained-solids overflow slots, orifices, or ports 43, 43, 44, and 45 respectively (Figure 3), with those on each tray staggered in location in relation to those on any tray next to it. To enable a layer of catalyst granules to accumulate, and be fairly continuously maintained, over substantially the entire top surface of each tray 31 through 34, the upper surface of each of them carries at least one solids-accumulation ridge 46, 47, 48, and 49 respectively. These ridges on their respective trays are relatively like, and advantageously concentric with, the short restraining rims 51, 52, 53, and 54, one of which borders respectively the innermost edge of each of the trays, and, when a plurality of ridges is provided on a tray, spaced away from one another across the tray, presenting an arrangement quite similar, as it were, to a chicken ladder.

In operation of the disengager 17 of Figures 2 and 3, catalyst-gas mixture 36 emerging from the exit end 27 of the lift 26 continues upwardly, under the momentum imparted to it by the lift gas, toward the top 55 of the disengager and the stream of solids flares out in all directions with its outermost bounds at least usually at an angle of about 7-15 degrees to the axis of the rising stream. The diameters of the concentric apertures 37, 38, 39, and 40 in the trays 31 through 34 are such that a line drawn through the intersection of the top edge of the rim of each of them with a plane through the axis of the solids-gas mixture stream 36 forms an angle to the axis of the stream of usually from over seven degrees to around 15 degrees. Thus these trays under suitable operating conditions will be out of the path of the rising stream of solids. Also any quite small amount of solids that undesignedly could possibly drop over the rim of a tray into its large central aperture will fall similarly out of the path of the rising stream. When the planned operating conditions for a new installation may necessitate it, the diameters of those apertures can be adjusted to form whatever different such angle is needed to meet these ends.

As the momentum of the rising solids is spent, they spread out more widely and shower downwardly in a form quite like that of an open umbrella of granular solids falling under the influence of gravity. Those solids that are impelled above the level of falling-solids detaining tray 31 (i. e. those that are expelled from the lift higher than the others), having reversed their direction and started to fall, land on tray 31 and, being banked up in part against the vertical wall of the disengager and further in part by the retaining ridge 46, initially accumulate in a layer over the surface of tray 31. Then as catalyst granules continue to land on this layer of granules on tray 31, their fall is cushioned because the loosely lying granules yield, and as their amount builds up until the top surface of the accumulation exceeds the angle of repose of the catalyst, those granules above the angle of repose and the additional granules continuing to reach tray 31 roll down to the lower part of it at its outer periphery, spill through the overflow ports 42 and drop down to the part of tray 32 below them.

Catalyst granules which are not impelled high, or outwardly far, enough to reach tray 31 land on falling-solids-detaining tray 32 and, banked up in part by the wall of the disengager and further in part by the retaining ridge 47 similarly build up a cushioning layer, on it. This layer builds up until the angle of repose is exceeded, and just as occurred with tray 31, the granules above the angle of repose and the additional ones continuing to reach tray 32 roll down to its lower part and together with catalyst granules that dropped to it from tray 31, spill through the overflow ports 43 to the part of tray 33 below them.

Similarly, catalyst granules that do not rise high enough or outwardly far enough to reach tray 32, land and accumulate on tray 33, and together with the granules that dropped to it from tray 32, spill through overflow ports 44 of tray 33 to the part of tray 34 below them. In like manner, the same occurs on tray 34 and the granules that land and accumulate on it from the stream 36 together with those that dropped to it from tray 33 spill through the overflow ports 45 to the top of surge bed bin 16. From the lower part of the latter the catalyst granules enter seal leg 18 and thereby start off again on the downflow pass of the cycle in the continuous circulation system. The lifting gas from which the solids have been separated leaves, by the gas outlet 29 in the top 55 of the disengager.

The embodiment shown in Figures 4 through 7 is in a sense a multi-disengager with each of seven separate single disengager sectors with its own fall-breaking unit and serving a separate pneumatic lift, but with all having a common gas outlet, common disengaging zone bottom, and a common surge bed. Referring to Figures 4 and 6 the cylindrical disengager-enclosing housing 60 envelopes and suitably supports a multi-disengager 61 of octagonal horizontal cross-section and divided into eight equal-sized sectors 62 through 69 symmetrically arranged around the hollow, common, and axially centrally located area 71 formed by the vertically edge to edge joined together narrow, vertical rear walls 72, of each of the eight sectors, with a common side wall 82, 83, 84, 85, 86, 87, 88, and 89 respectively shared jointly by each pair of adjoining sectors. Each of the eight sectors 61 through 68 houses an identically constructed falling-solids fall-breaking unit serving its individual pneumatic lift 91, 92, 93, 94, 95, 96, and 97 as part of an identically operating single disengaging unit.

Accordingly, the operation of these single disengaging units, each constituting a single octago-sector (the term being derived from octagon and sector), can be described in relation merely to one or two of them, for example, the disengaging unit of octago-sectors 63 and 67 (Figures 4 and 6). Their construction includes the same arrangement of solids-detaining trays, restraining rims, detaining ridges and overflow ports, as in the disengager of Figures 2 and 3, with the difference that while these various parts in that one arc of complete circular extent, each disengager unit of the Figures 4 through 7 modification includes those same parts only to the extent of one-eighth of a circle. The fall-breaking trays 101, 102, 103, and 104 (octago-sector 63), supported by the side walls 83 and 84, incline downwardly outwardly to, and at their respective lower edges join, the outer wall of the sector. Their inner edges carry restraining rims 105, 106, 107, and 108 respectively, and intermediate them and the sector outer wall are the solids-accumulation ridges 112, 113, and 114. At the junctions of the trays 101 through 104 with the sector outer wall are the overflow ports 115, 116, 117, and 118.

The restraining rims 105, 106, 107, and 108 are spaced away from the sector outer wall a progressively downwardly increasing distance, from tray to tray, for the trays to miss the path of the ascending emergent catalyst-gas mixture stream 121, but to be in the path of the falling catalyst granules, just as described in relation to the disengager of Figures 2 and 3, and with corresponding angular relationship to the stream.

Intermediate the level of the lowermost trays 104 and the bottom 122 of the enclosing housing 60 is the horizontal, common disengaging zone bottom-plate 123 separating the disengaging zone from the catalyst surge bed 124, and from which bottom-plate 123 depend eight catalyst downcomers 125 in addition to the plate overflow orifice 126. Outlet 127 for solids-freed gas is located centrally in the top of the enclosing housing, and disengaged solids feed line 128 is in its bottom 122 in the octago-sector 69 which has no disengaging unit.

As to operation of the multi-disengager of Figures 4 through 7, the procedure is the same for each of its seven disengager units from the emergence of the catalyst-lift gas mixture stream 121 from the exit end 129 of the lift to the spilling of the stream of disengaged catalyst granules 131 from the fall-breaking tray overflow ports 118 as described for the disengager of Figures 2 and 3. Then the solids-freed lift gas travels downwardly in the disengager unit and under the bottom edges 132 of the outer walls of the sectors up through the annular space 133 to the freed gas outlet 127. The disengaged catalyst spilling from the fall-breaking tray overflow ports 118 initially accumulates in mounds on the horizontal plate 123 and each mound builds up toward a downcomer 125, and as it reaches the angle of repose of the catalyst, the catalyst thereafter continuously passes through the downcomers 125 and builds up in mounds in the surge bed 124.

Figures 8 and 9 illustrate another embodiment of a multi-disengager serving six pneumatic lifts symmetrically arranged about a central point, but resembling more the disengager of Figures 2 and 3 with its fall-breaking section divided by catalyst-lift gas mixture guide vanes into six equal parts only up to about the edges of the fall-breaking trays nearer the ascending stream rather than into practically completely separate disengager units as shown in the modification of Figures 4 through 7.

In the disengager 140 of Figure 8, the disengaging zone bottom-plate 141, running horizontally across the disengager within its lower half, separates the disengaging zone 142 from the surge bed bin 143. Six pentagonally shaped mixture stream guide vanes 144 through 149 (with four of the sides of each vane at right angles to one another, and the longest side vertical, and the shortest side horizontal and at its bottom) are supported vertically within, and divide into six equal sectors, a vertically intermediate portion of the course to be taken by the mixture stream emerging from the six pneumatic lifts 151 through 156, positioned so that vertical projections of them appear symmetrically arranged with respect to the vanes. The guide vanes are supported along the longest side of each of them on the central post 157 which in turn is spaced away from, and supported by suitable brackets 158 fastened to, bottom-plate 141.

Spaced apart from, and above one another, and with their outermost peripheral edges parallel to one another and suitably supported from the disengager wall, falling-solids fall-breaking trays 160, 161, and 162 incline inwardly upwardly with each of them ending with its inner circular edge parallel to that of the others and falling in a frusto-conical plane coincident with a fifth (i. e. the inclined) side of vanes 144 through 149, from which the inner edges of these trays are supported. The particular arrangement of the trays so that their inner peripheries fall on an inverted frusto-conical plane is such that, as with the other modifications, the trays are out of the path of the ascending solids but in the path of the disengaged falling solids. Also, as in these other embodiments, a short restraining rim may rise respectively from the inner peripheral edge of each of the trays 160, 161, and 162, and their overflow ports 166, 167, and 168 occur spaced apart from one another along the respective outer periphery of each of them and staggered with respect to those in the tray next adjoining it. While not shown in the drawings, retaining ridges can be included on any or all of these trays for any installation in which that appears necessary regularly to maintain a continuous layer of solids on the tray for the indicated purpose.

Symmetrically encircling central overflow orifice 169 in bottom-plate 141 are six cylindrical catalyst downcomers 171 with their axes falling in a circle effectively concentric with the enclosing housing, similarly to the corresponding parts in the Figures 4 to 7 embodiment. A baffle-plate 172 is suitably suspended by brackets 173 from the ceiling of the disengager and below the solids-freed lift gas outlet 174 leading centrally out from the ceiling. Disengaged solids return feed line 18 (equivalent to the upper end of the reactor seal leg) leads downwardly from one side of the bottom of the disengager.

Even with the six (i. e. a plurality of) pneumatic lifts discharging into it, the disengager shown in Figures 8 and 9 operates substantially identically as does that of Figures 2 and 3, with the slight difference created by the inclusion of disengaging zone bottom-plate 141, as to which the operation follows that described above for the corresponding parts in Figure 4. It should also be noted that mixture stream guide vanes 144 through 149 merely serve to keep the individual streams emerging from the lifts apart while they ascend through the frusto-conical passage presented by the inner edges of the trays, and thereby avoid disturbed turbulent flow, and even additional collision impact attrition. The rest of the operation need not be repeated for it follows that given in relation to Figures 2 and 3.

The horizontal falling-solids detaining trays of the various embodiments of the apparatus of the invention by enabling the accumulation and maintenance of a layer of solids on the individual trays is a decided benefit by reducing to a minimum and practically eliminating the prospect of falling solids landing on metal or other hard structural parts, and providing for falling solids to contact substantially only other for the time being relatively stationary granular solids which present the further advantage of yielding spatially to impact from the landing disengaged granular solids. Provision of the restraining rims on the various trays, although not mandatory nor critical, is helpful toward the end just described.

Various possible changes in individual parts and in their number mentioned in relation to individual embodiments are also contemplated in relation to the different parts of the illustrated, as well as of other possible, modifications. The number and size of, and spatial relationship between, the various parts are influenced by such things as the catalyst load to be circulated, the height to which the granules are to be raised, the selected granule concentration in the lift fluid, and the selected lift diameters.

The method and apparatus of the invention are not confined to a disengager merely of cylindrical cross-section as in the illustrative drawings, nor to one serving solely the specific numbers of lifts, but are applicable also to one serving any suitable plurality of lifts. They are especially advantageously applicable to handling granular solids or pellets of at least all held on a sixty mesh screen or larger, and often of the order of all held on a fourteen mesh screen and somewhat larger. They can be coarse and irregular or of uniform shape, such as drop molded (e. g. spherical) pellets or beads, either porous, compressed and sintered, or solid throughout, as commonly seen in hydrocarbon reforming, or other, catalysts, such as the drop molded aluminum silicate petroleums cracking catalyst used in the non-turbulent bed methods. Their diameter or largest dimension can be at least about one millimeter and up to say fifteen millimeters, and preferably between two and eight millimeters, and advantageously between about two and five millimeters.

While the invention has been described in relation to certain specifically illustrated embodiments of it, it is understood that many substitutions and variations may be made in it within the range of the appending claims that are intended also to cover equivalents of the illustrative embodiments.

What is claimed is:

1. In a solid circulating system comprising at least one gas lift conduit and a solids discharge vessel surrounding the upper portion of the lift conduit into which vessel the conduit discharges a stream of gas and solids for disengagement in said vessel, and wherein said vessel is provided with an outlet for separate discharge of gas essentially freed of solids, the improvement which comprises in combination with said vessel of means for interrupting the downward descent of free-falling solids freed from gas in said vessel, said means comprising at least one downwardly and outwardly inclined surface located at an elevation above the discharge end of the lift conduit and in the path of the falling solids, the inner edge of said surface lying outside of the principal path traversed by the stream of rising solids emerging from the lift conduit, and at least one opening approximate the outer edge of said surface for discharge of solids from said surface to a level therebelow.

2. A solids circulating system as defined in claim 1 wherein said system comprises a plurality of gas lift conduits discharging into a single discharge vessel, means within said vessel to divide the same into a plurality of at least partially separated disengaging zones and so arranged that each of said lift conduits discharges into an individual one of said zones, each of said disengaging zones being provided with the defined means for interrupting the downward descent of falling solids.

3. In a solids circulating system comprising at least one gas lift conduit and a solids discharge vessel surrounding the upper portion of the lift conduit into which vessel the conduit discharges a stream of gas and solids for disengagement in said vessel, the improvement which comprises in combination with said vessel of a series of vertically spaced trays having their innermost edges spaced outwardly from a boundary defined by the periphery of the top lift conduit and the vertical projection of such periphery, all of said trays being downwardly and outwardly inclined away from said boundary, and at least one of said trays being located at a level above the top of the lift conduit, each of said trays having solids-passing orifices at the outermost edges thereof; whereby solids falling by gravity in said vessel, after having attained their maximum height of rise therein upon discharge from said lift conduit, are interrupted in their fall by said trays and discharged from said trays through said orifices.

4. The improvement as defined in claim 3 wherein a plurality of such vertically spaced trays are located at levels above the top of the lift conduit.

5. The improvement as defined in claim 4 wherein further the said orifices are staggered in relation from one tray to the next lower tray.

6. In a solids circulating system comprising a plurality of substantially parallel upright gas lift conduits adapted to discharge a stream of gas and solids upwardly into at least one gas-disengaging zone, said zone being bounded by an outer vertical wall, a plurality of vertically spaced trays inclined downwardly toward said outer wall, the innermost edges of said trays being spaced inwardly from an upwardly and outwardly directed line of reference drawn from the upper outer edge of said lift conduit at an angle of at least seven degrees with the vertical, said trays at points adjacent the said outer wall being provided with openings for discharge of solids from said trays; whereby descending solids from said stream are maintained free of interference with the upwardly discharged stream of solids and the fall of such descending solids is interrupted in their downward path within said disengaging zone.

7. In a solids circulating system comprising at least one upright gas lift conduit adapted to discharge a stream of solids and gas upwardly into an enclosed area of greater cross section than said conduit, in which area separation of gas and solids occurs with consequent reversal of movement of said solids to descend by gravity through a downflow path, the improvement which comprises: a plurality of vertically spaced trays located within said enclosed area and arranged to intercept descending solids in said downflow path, all of said trays having their innermost edges spaced outwardly from the outer boundary of the said stream, in such manner as to define an inverted substantially frusto-conical path through which said upwardly directed stream may pass without upwardly moving solids therein contacting said trays; said trays being inclined downwardly and outwardly and having openings therein spaced radially outward from said innermost edges; whereby solids falling onto said trays are discharged to a level below, thus shortening the path of free fall of said descending solids.

8. A system as defined in claim 7 wherein at least the lower of said plurality of trays are provided with a flow-retarding obstruction so as to tend to maintain a layer of static solids on the upper surface of such tray.

9. A system as defined in claim 7 wherein at least one of said trays is provided at its inner peripheral edge with an upstanding ledge.

10. A system as defined in claim 7 wherein said trays are inclined at an angle measured to the horizontal greater than the angle of repose of said solids and at least part of said trays are provided with ridges on the surface thereof to retard flow of solids thereon.

11. In a solids circulating system comprising a vertical gas lift conduit and a solids discharge chamber surrounding the upper portion of the lift conduit and into which chamber the conduit discharges a stream of gas and frangible solids for disengagement in said chamber, the improvement which comprises in combination with said chamber of a series of vertically spaced apart trays having their innermost edges spaced outwardly from a boundary defined by the periphery of the top of the lift conduit and the vertical projection of such periphery, said trays being downwardly and outwardly inclined away from said boundary, and at least one of said trays being located at a level above the top of the lift conduit, each of said trays having solids-passing orifices at the outermost edges thereof; whereby solids falling by gravity in said chamber, after having attained their maximum height of rise therein upon discharge from said lift conduit, are interrupted in their fall by said trays and discharged from said trays through said orifices.

12. The improvement as defined in claim 11, wherein a plurality of such vertically spaced apart trays are located at levels above the top of the lift conduit.

13. The improvement as defined in claim 12 wherein further the said orifices are staggered in relation from one tray to the next lower tray.

14. In a solids circulating system comprising an upright gas lift conduit adapted to discharge a stream of frangible solids and gas upwardly into an enclosed area of greater cross section than said conduit, in which area separation of gas and solids occurs with consequent reversal of movement of said solids to descend by gravity through a downflow path, the improvement which comprises: a plurality of vertically spaced apart trays located within said enclosed area and arranged to intercept descending solids in said downflow path, each of said trays having its innermost edge spaced approaching and outwardly from the outer boundary of said stream and outwardly more from it than the corresponding edge of any next lower tray, all in such manner that said upwardly directed stream may pass without upwardly moving solids therein contacting said trays; said trays being inclined downwardly and outwardly and having openings therein spaced radially outward from said innermost edges; whereby solids falling onto said trays are discharged to a level below, thus shortening the path of free fall of said descending solids.

15. A system as defined in claim 14 wherein at least the lower of said plurality of trays are provided with a flow-retarding obstruction so as to tend to maintain a layer of static solids on the upper surface of such tray.

(References on following page)

References Cited in the file of this patent

UNITED STATES PATENTS

| | | |
|---|---|---|
| 688,693 | Richter | Dec. 10, 1901 |
| 824,585 | Rieth | June 26, 1906 |
| 1,438,996 | Griffin | Dec. 19, 1922 |
| 1,597,438 | Ennis | Aug. 24, 1926 |
| 2,246,349 | Crum | June 17, 1941 |

FOREIGN PATENTS

| | | |
|---|---|---|
| 278,858 | Germany | July 18, 1913 |
| 313,613 | Germany | Aug. 24, 1916 |
| 311,639 | Great Britain | May 16, 1929 |

UNITED STATES PATENT OFFICE
CERTIFICATE OF CORRECTION

Patent No. 2,809,871 — October 15, 1957

David B. Ardern

It is hereby certified that error appears in the printed specification of the above numbered patent requiring correction and that the said Letters Patent should read as corrected below.

Column 2, line 43, for "pipes or" read -- pipes of --; column 5, line 8, for "ports 43," read -- ports 42, --; column 6, line 33, for "eight sectors 61" read -- seven sectors 62 --.

Signed and sealed this 17th day of December 1957.

(SEAL)
Attest:

KARL H. AXLINE
Attesting Officer

ROBERT C. WATSON
Commissioner of Patents